Jan. 17, 1967
A. E. NEWTON
3,298,572
CEMENT DISPENSERS
Filed April 9, 1965
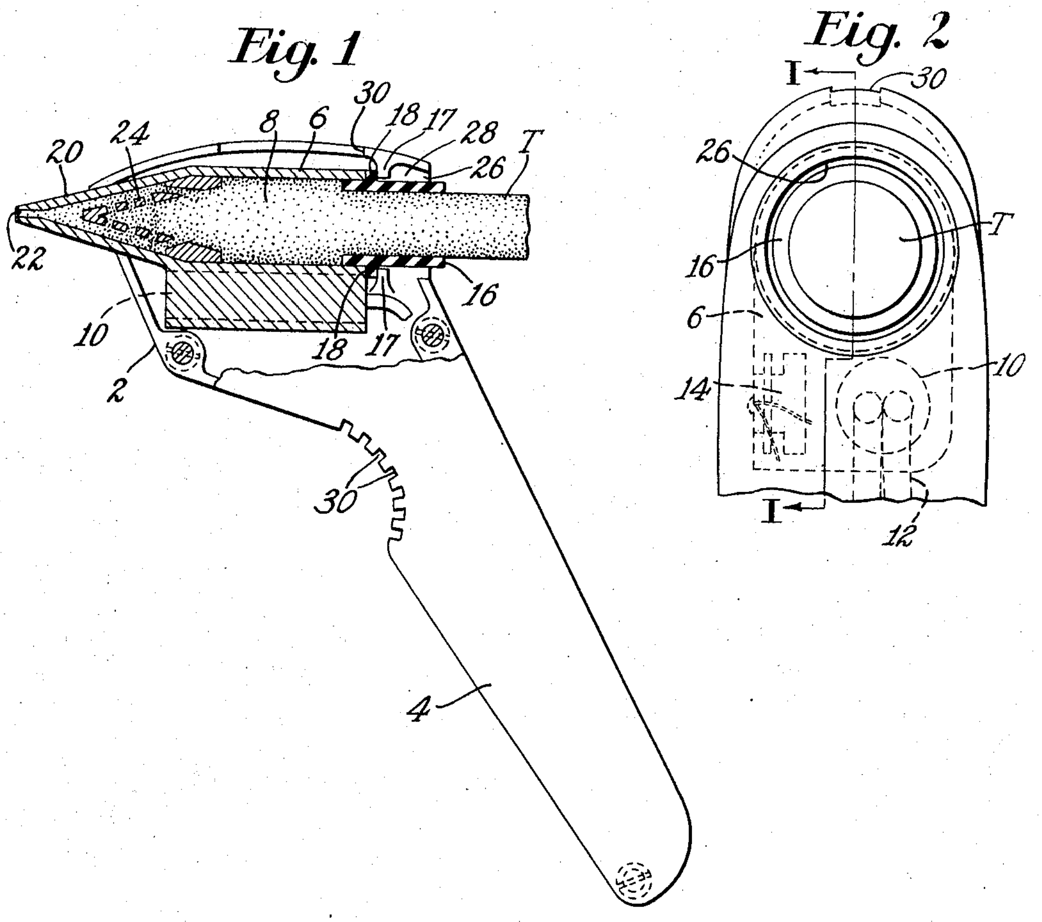
Fig. 1, Fig. 2
Fig. 3
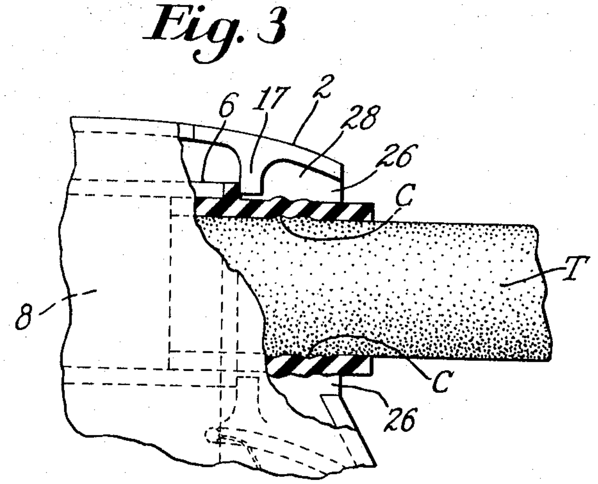
Inventor
Albert E. Newton
By his Attorney
Scott R. Foster

1

3,298,572
CEMENT DISPENSERS
Albert E. Newton, Beverly, Mass., assignor to United Shoe Machinery Corporation, Boston, Mass., a corporation of New Jersey
Filed Apr. 9, 1965, Ser. No. 447,107
5 Claims. (Cl. 222—146)

This application is a continuation-in-part of my copending application Serial No. 441,056 entiled "Cement Dispenser" filed March 19, 1965, now abandoned.

This invention relates to thermoplastic adhesive cement melting and dispensing devices and patricularly to an improved hand-held device for dispensing thermoplastic adhesive.

Hot melt adhesive cements offer many advantages because of their freedom from solvents and their quick setting abilities. For many reasons including convenience of adhesive supply and reduced time at which adhesive cement is held at elevated temperatures, the "direct through feed thermoplastic adhesive melting and applying system" has found wide favor and has been used in a variety of relationships. In this system a rod or strand of thermoplastic adhesive cement is supplied as needed to the inlet of a heating passageway in which it is melted and then supplied to a surface to be adhered. Ordinarily, the force to move the molten adhesive through the device and to apply it on a desired surface is supplied by pumping means which may be a rotating wheel, a gear pump or even a simple piston and cylinder. These pumping systems are employed since it is difficult in practice to make the inlet port of the melting and applying device sufficiently tight to the rod or strand adhesive to enable the rod or strand adhesive to create pressure to move the adhesive through the device. Additionally, the temperature of the inlet port tends to reach a value such that the adhesive rod softens and may even melt and adhere to the walls of the inlet port and cause some difficulty in feeding the rod or strand particularly when restarting the device from cold condition. An inlet tube provided with cooling means or an inlet tube formed of a non-heat-conductive low friction material, e.g. Teflon, has been used in a cement dispenser forming the subject of an applciation in the name of Hans C. Paulsen filed March 16, 1964 to reduce this difficulty. However, even with such expedients it is often found that a warming of the inlet tube may be needed before the rod or strand of material can be fed in freely through the tube.

It is an object of the present invention to provide a melting and dispensing device including an improved inlet member having markedly reduced resistance to passage of a rod or strand of adhesive which has been partially melted and solidified in contact with the walls of the entrance port.

It is a further object of the invention to provide an improved simple and inexpensive portable melting and dispensing tool in which feeding of a solid body of thermoplastic adhesive cement or the like supplies pressure more effectively to deliver molten adhesive from the device for application to a work surface.

To these ends and in accordance with a feature of the present invention there is provided a melting and dispensing device including a heated melting chamber, an exit opening for delivery and dispensing of molten adhesive and an entrance tube of elastic non-heat-conductive material such as a heat-resistant rubber through which a supply body of thermoplastic material is fed to the chamber. The entrance tube is shaped for relatively close sliding fit with a rod, strand or other uniform cross section thermoplastic supply body and is retained at its end leading to the melting chamber, but with an annular space around

2 the tube throughout most of its length. The elastic tube so mounted will receive and pass the adhesive supply body to the melting chamber and free itself of adhesive and mechanical engagement with the supply body and substantially reduce the warm up time.

In accordance with a further feature, there is provided a simple inexpensive portable melting and dispensing device including a handle, a heated melting chamber with associated cement applying orifice and an elastic entrance tube communicating with the melting chamber and constructed and arranged to guide a uniform cross section solid body of thermoplastic adhesive cement into the melting chamber with one end of the supply body exposed and conveniently placed so as to be fed to the melting chamber by force applied by a finger of the operator.

The above and other features of the invention, including various novel details of construction and combinations of parts will now be more patricularly described with reference to the accompanying drawings and pointed out in the claims. It will be understood that the particular device embodying the invention, i.e. a hand-held adhesive melting and applying device, is shown by way of illustration only and not as a limitation of the invention. The principles and features of this invention may be employed in varied and numerous embodiments including systems for melting a uniform cross section supply body, e.g. a rod or strand of indefinite length without departing from the scope of the invention.

In the drawings:

FIG. 1 is a side elevational view of one form of dispenser embodying the invention and showing a portion of the device in section taken substantially along the line I—I of FIG. 2;

FIG. 2 is a back elevational view of the tool; and

FIG. 3 is an enlarged sectional view of a portion of the tool showing the reaction of the entrance tube to irregularities on the supply body such as material which has flowed back in molten condition and solidified on the surfaces of the supply body.

As illustrated, the device comprises a frame 2 which may be made of any suitable non-heat-conducting material and which has a grip portion 4 to facilitate handling by an operator. The frame 2 is adapted to retain a melting chamber housing 6 made of a good heat conductor and having a melting chamber 8 for the melting of thermoplastic cement. An electrical heating element 10 is disposed in the housing 6 for imparting heat to the melting chamber 8. A pair of electrical leads 12 connect the heating element 10 with a source of electricity, not shown. A thermostat 14 is also mounted in the housing 6 and controls the heat output of the heating element 10. The melting chamber housing 6 receives at its rearward end, or at its end to the right as viewed in FIG. 1, a tubular entrance sleeve 16 made of a rubbery elastic non-heat-conducting material. The tube material must be capable of withstanding the temperatures required to melt the thermoplastic supply body. For the adhesive used in the hand-held device, the materials should be capable of withstanding extended heating at 400° F. Also for the desired action best results have been obtained with rubbery materials having a hardness of from about 20 to about 100 durometer (Shore A). Heat-resisting rubbers having properties suitable for this use are the silicone elastomers and the fluoroelastomers. For example, there may be used general purpose silicone rubber compositions usually containing finely divided mineral filler such as silica, and fluoroelastomers such as "Viton A," a copolymer of hexafluoropropylene and vinylidene fluoride. The sleeve 16 is adapted to receive a uniform cross section, usually cylindrical, thermoplastic cement block T in solid form, the block T having a diameter snugly fitting the inside diameter of the sleeve. The sleeve is held in place by the housing 6 and by an annular inwardly extending member 17, which may be an integral part of the frame 2, and which in cooperation with the housing 6, securely retains in place a flange 18 disposed near one end of the sleeve 16. The melting chamber housing 6 is provided at its forward end (to the left as viewed in FIG. 1) with a nozzle portion 20 having a discharge passage 22 leading outwardly from the melt chamber 8. A cement divider 24 composed of a good heat conductor, such as aluminum, may be disposed in the forward portion of the melt chamber for the purposes of dividing the cement into several smaller streams, which are more thoroughly penetrated by heat, and of conducting heat into the mass of cement. As may be noted in FIGS. 1 and 3, the entrance sleeve 16 is disposed in a cavity 28 in the frame 2 and is accordingly surrounded throughout most of its length by an annular space or air gap 26 formed by the frame 2 and the periphery of the sleeve 16. The air gap permits the wall of the sleeve 16 to yield radially outwardly as will be described below. However, the walls of the cavity will present excessive angular displacement of the sleeve which might interfere with forward movement of the supply body.

The grip portion 4 of the tool is adapted to be held in an operator's hand. To dispense molten cement from the passage 22, a thermoplastic cement block T, which may conveniently be approximately 3" in length, is inserted in the sleeve 16. The forward end of the block is guided by by the sleeve into the chamber 8 where heat conducted through the housing 6 acts to melt the inwardly extending end of the block. The rearward end of the block T projects from the rearward end of the sleeve 16 where it may be conveniently engaged by an operator's thumb.

The sleeve 16, being non-heat-conductive, permits substantial heating of the thermoplastic block T only in the melting chamber 8 and the block, by and large, melts only in the chamber 8.

When molten cement is to be dispensed from the passage 22 the operator pushes the block T into the sleeve 16. As it moves through the sleeve, the block acts as a piston upon the molten cement in the melting chamber 8 and the pressure thus generated forces the cement through the divider 24 and through the discharge passage 22 for application to a work piece.

The pressure within the melting chamber tends to cause portions of the molten cement to back up and squeeze into any spaces between the block T and the walls of the elastic sleeve. The penetration of the molten cement into the space is limited by cooling and solidification and a sleeve length of about ½ inch has been found long enough to prevent squeeze back. But the cement whether molten or solidified serves to seal any spaces or crevices between the supply body and inlet tube to enable the generation of desired pressure for application of the cement by the action of the incoming block T serving as a piston or a plunger. Where the melting and dispensing device is allowed to cool and is warmed up again for later use, the cement solidified around the block creates enlarged portions C which would tend to obstruct subsequent free movement of the supply body through an unyielding inlet tube. However, referring to FIG. 3, this obstructing action is substantially eliminated through the atcion of the elastic sleeve. That is since the wall of the sleeve 16 is not in contact with the frame wall of the cavity 28, it is not restrained from expanding radially outwards and is readily expanded under pressure from the enlarged portions C even though those portions have not yet been affected by heat. Also the sleeve yields and deflects when pressure is applied to the block so that any slight adhesive bond that might exist between the adhesive and the walls of the inlet sleeve is peeled away and broken and hence offers little resistance to forward movement of the supply body. With the silicone rubber or fluoroelastomer sleeves of the preferred hardness best results have been obtained with a wall thickness of about 1/16 inch in a sleeve having an internal diameter of ½ inch. With such tubes as soon as the end of the block T in the melting chamber becomes fluid, the block may be pushed forward and the tool made available for immediate use.

When it is desired to insert another cement block, the operator waits until the trailing end of the block T in use is pushed slightly into the tube. He then merely inserts a second block end-to-end with the one in the tube and resumes operation of the tool. The cement is likely to "flare out" at the interblock junctures and form enlarged portions extending beyond the normal periphery of the blocks. The present invention has been found to be particularly helpful in reducing the warm-up time required to get such block junctures moving toward the melting chamber.

The frame 2 may be provided with cooling vents 30 to prevent the build up of heat within the frame.

While I have shown and described a preferred form of my invention particularly directed to the dispensing of thermoplastic cement from a hand-held device, it is obvious that thermoplastic materials other than cement could be dispensed and that various changes may be made in the construction of the tool by those skilled in the art, without departing from the spirit of the invention as defined in the patent claims. For example, the present invention may be used in continuous industrial type cement dispensers.

Having thus described my invention, what I claim as novel and desire to secure by Letters Patent of the United States is:

1. A device for dispensing molten thermoplastic material comprising a housing having a melting chamber and a discharge passage leading outwardly therefrom, and a tubular sleeve received in a portion of said housing remote from said discharge passage and adapted to guide a substantially uniform cross section supply body of solid thermoplastic material to said melting chamber, said sleeve having an internal surface providing a sliding fit for said supply body and being formed of heat resistant non-heat-conductive rubbery elastic material having sufficient flexibility to yield upon engagement with irregularities in the supply body and means for heating said melting chamber.

2. A device for dispensing molten thermoplastic material comprising a housing having a melting chamber and a discharge passage leading outwardly therefrom, a tubular sleeve received in a portion of said housing remote from said discharge passage for guiding a substantially uniform cross section supply body of solid thermoplastic material into said melting chamber, said sleeve having an internal surface complementary to the surface of the supply body for providing a sliding fit and being formed of heat resistant non-heat-conductive rubbery elastic material having sufficient flexibilty to yield upon engagement with irregularities in the supply body, the outside of said sleeve being free to expand radially outwards substantially throughout the length of said sleeve, and means for heating said melting chamber.

3. A device for dispensing molten thermoplastic material comprising a frame, a housing retained by said frame and having a melting chamber and a discharge passage leading outwardly therefrom, said frame having a cavity leading inwardly to said melting chamber, a tubular sleeve received in said housing and disposed in said cavity for guiding a substantially uniform cross section supply body of solid thermoplastic material into said melting chamber, said sleeve having an internal surface complementary to the surface of the supply body for providing a sliding fit and being formed of heat resistant non-heat-conductive rubbery elastic material having sufficient flexibility to yield upon engagement with irregularities in the supply body, said sleeve having an outside diameter less than the diameter of said cavity substantially throughout the length of the sleeve, and means for heating said melting chamber.

4. A device for dispensing molten thermoplastic material comprising a frame, a heatable housing retained by said frame and having a melting chamber and a discharge passage leading outwardly therefrom, said frame having a cavity leading inwardly to said melting chamber, a tubular sleeve formed of heat resistant non-heat-conductive rubbery elastic material disposed within said cavity, said cavity having a diameter greater than the outside diameter of said sleeve, one end of said sleeve being connected to a portion of said housing remote from said discharge passage and the other end of said sleeve extending outwardly therefrom, said sleeve being aligned axially with said cavity and being adapted to yieldably fit and guide a cylindrical body of thermoplastic material toward said melting chamber.

5. A device for dispensing molten thermoplastic material comprising a frame, a housing retained by said frame, said housing having a melting chamber and a discharge passage leading outwardly therefrom, a sleeve secured to said housing at the end of the housing generally opposite to the end with the discharge passage, said sleeve extending inwardly through the housing toward said melting chamber and extending outwardly from said housing, said sleeve being adapted to receive a cylindrical block of solid thermoplastic material with one end in said melting chamber and the other end projecting beyond the end of said sleeve remote from said melting chamber, said sleeve having an internal surface complementary to the surface of said block to provide a sliding fit and being formed of heat resistant non-heat-conductive rubbery elastic material, the sleeve having an outside diameter smaller than the diameter of the surrounding frame whereby the walls of said sleeve substantially throughout its length are separated from said frame, a handle projecting from said housing and means contained in said housing for heating said melting chamber so that the leading end of the block of thermoplastic material is progressively melted in said chamber and molten material extruded through said discharge passage as said block is pushed along said sleeve and into said melting chamber.

References Cited by the Examiner

UNITED STATES PATENTS

| | | | |
|---|---|---|---|
| 2,054,506 | 9/1936 | Leitsch | 228—53 |
| 2,118,415 | 5/1938 | Pesark | 120—116 |
| 2,380,138 | 7/1945 | Abramson | 15—504 |
| 2,556,609 | 6/1951 | Arkless | 219—227 |
| 3,204,828 | 9/1965 | Paulsen | 222—146 |

RAPHAEL M. LUPO, *Primary Examiner.*